US012083800B2

(12) United States Patent
Fujisaki et al.

(10) Patent No.: US 12,083,800 B2
(45) Date of Patent: Sep. 10, 2024

(54) RECORDING APPARATUS AND WIPING METHOD

(71) Applicant: CANON KABUSHIKI KAISHA, Tokyo (JP)

(72) Inventors: Shimpei Fujisaki, Tokyo (JP); Hideaki Matsumura, Kanagawa (JP); Hiromasa Tsutsumi, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 17/528,044

(22) Filed: Nov. 16, 2021

(65) Prior Publication Data

US 2022/0161563 A1 May 26, 2022

(30) Foreign Application Priority Data

Nov. 26, 2020 (JP) ................................ 2020-196419

(51) Int. Cl.
*B41J 2/165* (2006.01)

(52) U.S. Cl.
CPC ................................ *B41J 2/16547* (2013.01)

(58) Field of Classification Search
None
See application file for complete search history.

(56) References Cited

U.S. PATENT DOCUMENTS

| | | | | | |
|---|---|---|---|---|---|
| 5,396,277 | A * | 3/1995 | Gast | B41J 2/16538 | 347/33 |
| 6,109,725 | A * | 8/2000 | Saikawa | B41J 2/16538 | 347/33 |
| 2009/0185000 | A1* | 7/2009 | Ikegame | B41J 2/16508 | 347/33 |
| 2010/0045734 | A1 | 2/2010 | Tamaki | | |

FOREIGN PATENT DOCUMENTS

| | | | |
|---|---|---|---|
| JP | H06091887 | A | 4/1994 |
| JP | 2009196355 | A | 9/2009 |
| JP | 2010046838 | A | 3/2010 |
| JP | 2020059253 | A | 4/2020 |

* cited by examiner

*Primary Examiner* — Alejandro Valencia
(74) *Attorney, Agent, or Firm* — Canon U.S.A., Inc. IP Division

(57) ABSTRACT

A recording apparatus includes a recording head having an ejection port surface and a step portion, a blade to wipe the ejection port surface, and a moving unit. A plurality of ink ejection ports is arranged on the ejection port surface. The moving unit performs relative movement of the blade and the recording head by moving the blade or the recording head in a first direction to cause the blade to wipe a wiped surface including the ejection port surface, from the step portion to an area in which the plurality of ink ejection ports is arranged. The moving unit performs the relative movement so that a first relative velocity of the relative movement when the blade passes the step portion is higher than a second relative velocity of the relative movement when the blade, that has been in contact with the wiped surface, is separated from the wiped surface.

13 Claims, 13 Drawing Sheets

RECORDING APPARATUS AND WIPING METHOD

BACKGROUND

Field

The present disclosure relates to a recording apparatus and a wiping method.

Description of the Related Art

An inkjet recording apparatus that wipes an ejection port surface using a blade for wiping the ejection port surface to maintain an ejection state of ink from an ejection port has been known.

United States Patent Application Publication No. 2010/0045734 discusses a technique of moving a blade, on an ejection surface on which an ejection port is arranged, from a non-ejection area in which no ejection port is formed to an ejection area in which the ejection port is formed, to wipe the ejection surface.

Depending on a configuration of a recording head, there is a case where an area in which no ejection port is formed on an ejection port surface has a step portion. In such a configuration, there is a case where ink is accumulated in the step portion. When the ink accumulated in the step portion is drawn out by a blade coming in contact with the step portion at the time of wiping and adheres to the ejection port, there is a possibility that an ejection failure occurs.

SUMMARY

The present disclosure is directed to a technique of preventing ink, which is accumulated in a step portion on an ejection port surface of a recording head, from adhering to the surroundings of an ejection port at the time of wiping.

According to an aspect of the present disclosure, a recording apparatus includes a recording head including an ejection port surface and a step portion, wherein a plurality of ejection ports configured to eject ink is arranged on the ejection port surface, and wherein the step portion is formed by at least one of a projecting portion that projects from the ejection port surface or a recessed portion that is recessed from the ejection port surface at a position different from an area in which the plurality of ejection ports is arranged on the ejection port surface side, a blade configured to wipe the ejection port surface, and a moving unit configured to perform relative movement of the blade and the recording head by moving at least one of the blade or the recording head so as to move the blade, with respect to the recording head, in a first direction, wherein the relative movement of the blade and the recording head performed by the moving unit causes the blade to wipe a wiped surface including the ejection port surface in the first direction from the step portion to the area in which the plurality of ejection ports is arranged, and wherein the moving unit is configured to perform the relative movement of the blade and the recording head so that a first relative velocity of the relative movement of the blade and the recording head performed by the moving unit when the blade passes the step portion is higher than a second relative velocity of the relative movement of the blade and the recording head when the blade that has been in contact with the wiped surface is separated from the wiped surface.

Further features of the present disclosure will become apparent from the following description of exemplary embodiments with reference to the attached drawings.

DESCRIPTION OF THE EMBODIMENTS

An exemplary embodiment of the present disclosure will be described in detail below with reference to the attached drawings. The same reference sign indicates the same part or a corresponding part throughout the drawings.

(Description about Overall View of Inkjet Recording Apparatus)

Figure 1:
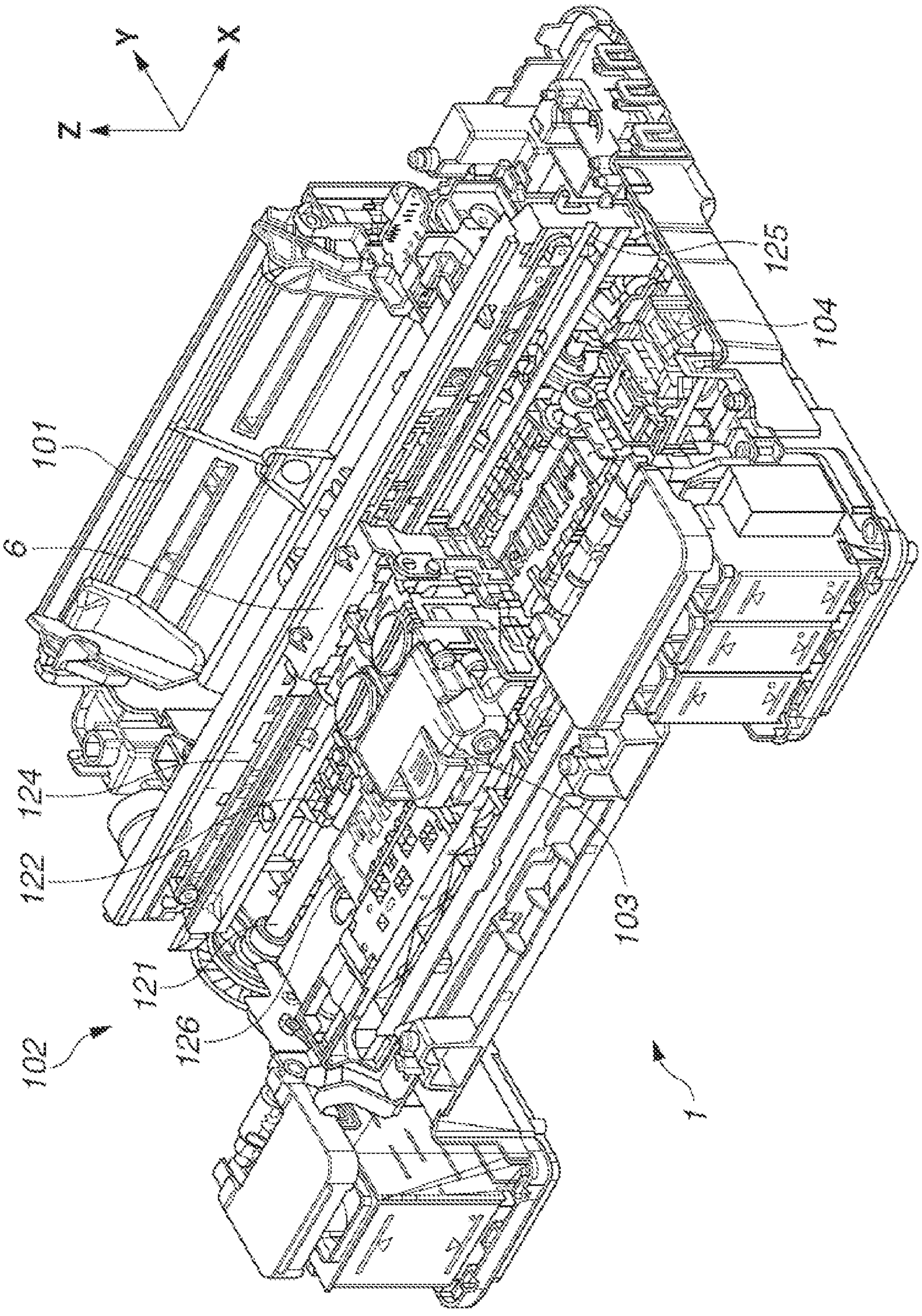
FIG. 1 is a perspective view illustrating an internal configuration of an inkjet recording apparatus according to an exemplary embodiment.

FIG. 1 is a perspective view illustrating an internal configuration of an inkjet recording apparatus 1 according to the present exemplary embodiment.

As illustrated in FIG. 1, the inkjet recording apparatus (hereinafter also simply referred to as a recording apparatus) 1 includes a paper feeding unit 101, a conveying unit 102, a recording mechanism unit 103, and a recovery mechanism unit 104. The paper feeding unit 101 supplies a recording medium, such as recording paper, to the inside of the recording apparatus 1. The conveying unit 102 conveys the recording medium supplied from the paper feeding unit 101 in a −Y direction. The recording mechanism unit 103 operates based on image information, and records an image on the recording medium. The recovery mechanism unit 104 is a unit for maintaining or recovering ink ejecting performance of a recording head.

The recording medium loaded on the paper feeding unit 101 is separated one sheet by one sheet and sent by a paper feeding roller driven by a paper feeding/conveying motor 205 (FIG. 2), and is supplied to the conveying unit 102. The recording medium supplied to the conveying unit 102 is conveyed onto a platen 126 while being pinched by a conveying roller 121 driven by the paper feeding/conveying motor 205 and a pinch roller 122.

The recording mechanism unit 103 performs recording on the recording medium conveyed onto the platen 126. The recording mechanism unit 103 drives a carriage 6, on which a recording head 5 (refer to FIG. 3) is mounted and that moves in a main-scanning direction (X direction), based on image information, and ejects ink from an ejection port of the recording head 5 to perform recording. The recording medium on which recording has been performed is pinched by a discharging roller driven in synchronization with the conveying roller 121 and a spur roller, and is thereby discharged to the outside of an apparatus main body.

The recording mechanism unit 103 includes the carriage 6 capable of reciprocally moving in the main-scanning direction (X direction) and a recording cartridge that is mounted on the carriage 6. The carriage 6 is guided and supported by a guide rail so as to be able to reciprocally move along the guide rail installed on the main apparatus body. The reciprocal movement of the carriage 6 is driven by a carriage motor 204 (FIG. 2) via a carriage belt 124. The reciprocal movement of the carriage 6 is controlled by an encoder sensor mounted on the carriage 6 and an encoder scale 125 which extends on the apparatus main body side, detecting a position and velocity of the carriage 6. Recording on the whole of the recording medium is performed by repetition of the following operation. An image for one-time scanning is recorded by a recording operation of the recording head 5 in synchronization with the movement (main-scanning) of the carriage 6, and the recording medium is conveyed (sub-scanning) by a predetermined pitch every time the recording by one-time scanning is finished.

The recovery mechanism unit 104 is provided to eliminate clogging or the like in the ejection port of the recording head 5, and thereby maintain or recover quality of an image to be recorded in or to a normal state. The recovery mechanism unit 104 includes a wiping mechanism for wiping an ejection port surface, a capping mechanism for covering the ejection port surface, and a pump mechanism for sucking ink from the ejection port. The recovery mechanism unit 104 according to the present exemplary embodiment includes a slider 7 that is movable within a predetermined range following the movement of the carriage 6 when the carriage 6 moves toward the recovery mechanism unit 104, which will be described with reference to FIG. 4. Blades 8 and 9 of the wiping mechanism and caps 1A and 1B of the capping mechanism are mounted on the slider 7.

Description about Block Diagram

Figure 2:
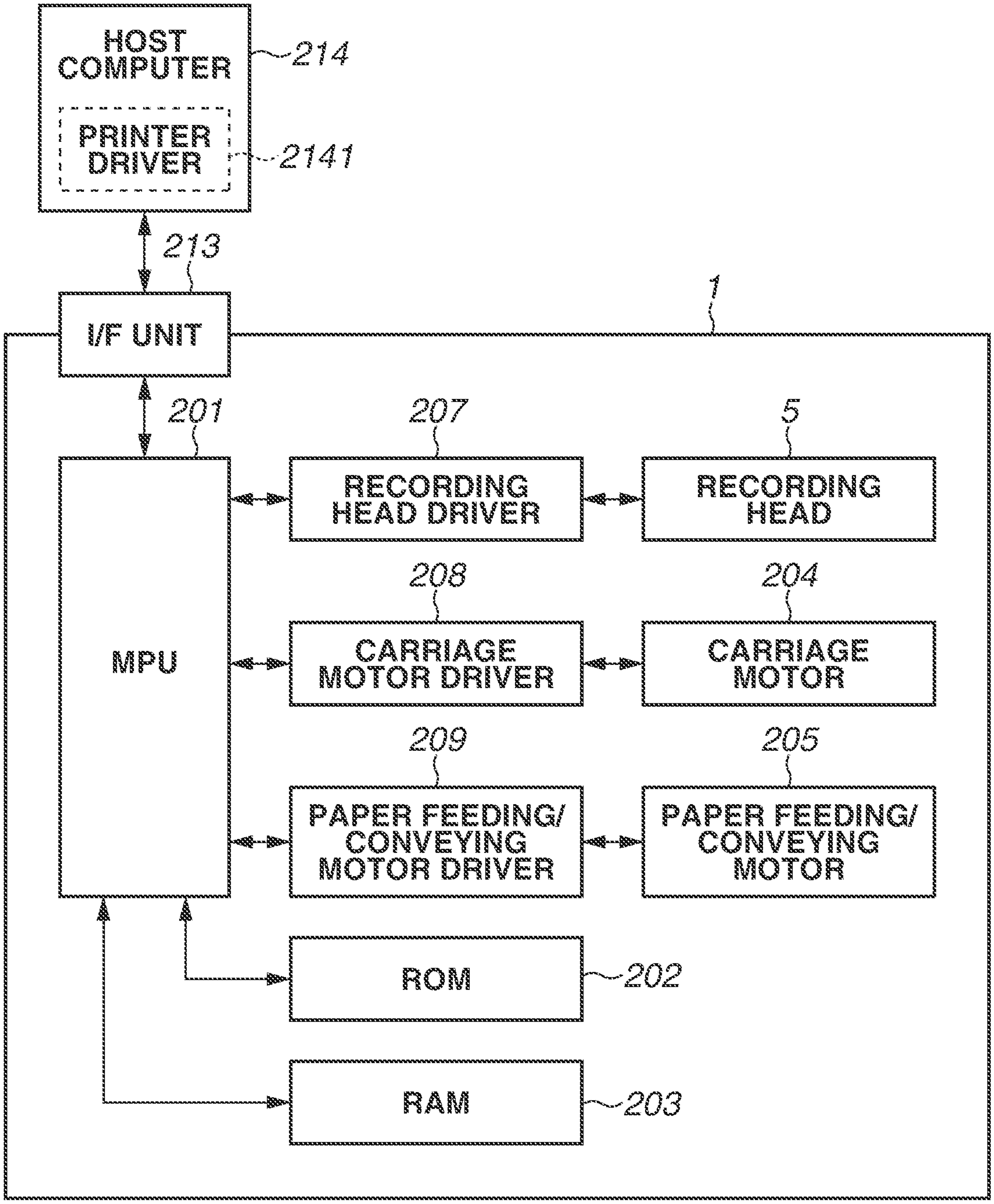
FIG. 2 is a block diagram illustrating the inkjet recording apparatus according to the present exemplary embodiment.

FIG. 2 is a block diagram of the inkjet recording apparatus 1 according to the present exemplary embodiment. As illustrated in FIG. 2, a microprocessing unit (MPU) 201 controls an operation of each unit of the recording apparatus 1, processing of data, and the like. A read-only memory (ROM) 202 stores therein a program and data executed by the MPU 201. A random-access memory (RAM) 203 temporarily stores therein processing data executed by the MPU 201 and data received from a host computer 214.

The recording head 5 is controlled by a recording head driver 207. The carriage motor 204 driving the carriage 6 is controlled by a carriage motor driver 208. A paper feeding roller, the conveying roller 121, and the discharging roller driven in synchronization with the conveying roller 121 are driven by the paper feeding/conveying motor 205. The paper feeding/conveying motor 205 is controlled by a paper feeding/conveying motor driver 209.

The host computer 214 is provided with a printer driver 2141 for communicating a recorded image and recording information such as quality of the recorded image with the recording apparatus 1 when execution of a recording operation is instructed by a user. The MPU 201 executes exchanging of the recorded image and the like with the host computer 214 via an interface (I/F) unit 213.

Detailed Description about Recording Mechanism Unit 103

Figure 3:
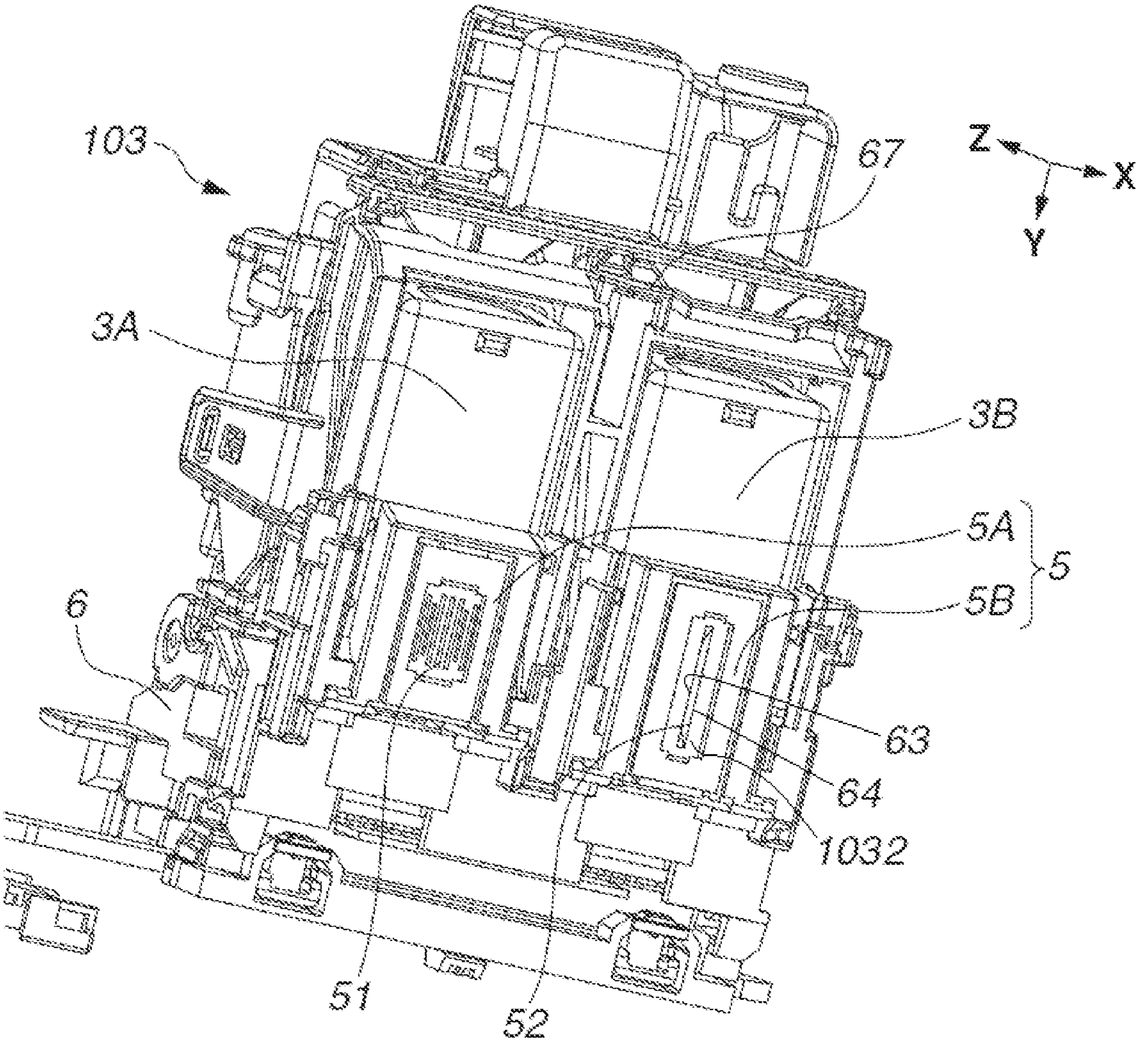
FIG. 3 is a perspective view illustrating a recording mechanism unit according to the present exemplary embodiment.

FIG. 3 is a perspective view illustrating the recording mechanism unit 103 according to the present exemplary embodiment. As illustrated in FIG. 3, two recording cartridges 3A and 3B are detachably mounted on the carriage 6. The recording cartridge 3A is an ink cartridge in which a recording head 5A and an ink tank is integrated with each other. The recording cartridge 3B is an ink cartridge in which a recording head 5B and an ink tank is integrated with each other. The recording cartridge 3A for colors is provided with the recording head 5A that performs recording using ink in a plurality of colors. The recording cartridge 3B for a single color is provided with the recording head 5B that performs recording using ink in a single color (for example, black). For example, ejection port arrays, arranged in the X direction, that eject respective ink in three colors of cyan, magenta, and yellow are formed on an ejection port surface 51 of the recording head 5A. Each of the ejection port arrays comprises a plurality of the ejection port arranged in a Y direction. An ejection port array that ejects ink in the single color such as black is formed on an ejection port surface 52 of the recording head 5B.

A configuration of the ejection port array of the recording head is not limited thereto. For example, a plurality of ejection port arrays that ejects ink in different colors may also be formed on the recording head 5B. Instead of an ink cartridge method, a configuration in which the recording head and the ink tank are separately formed may be employed.

Detailed Description about Recovery Mechanism Unit 104

Figure 4:
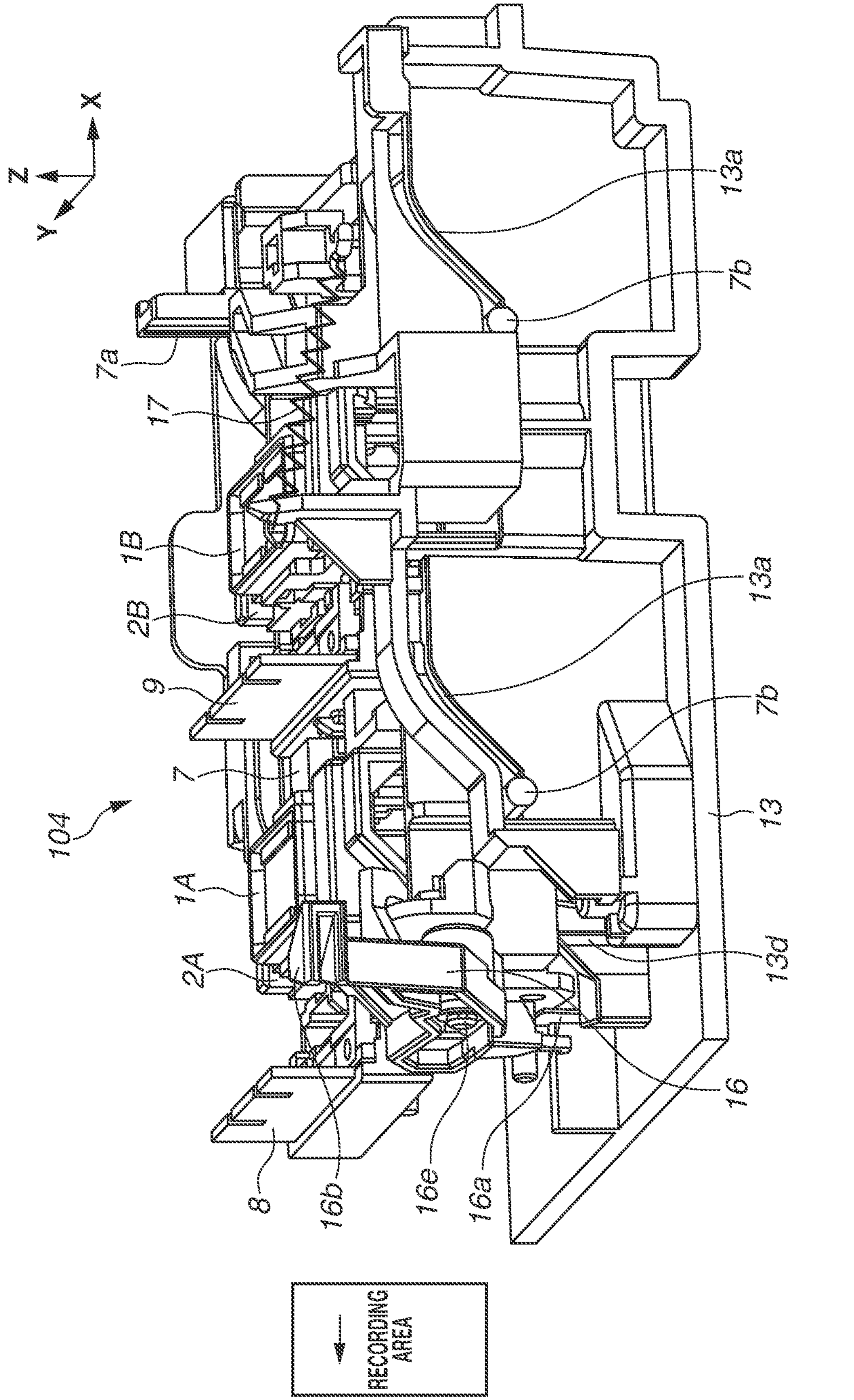
FIG. 4 is a perspective view illustrating a recovery mechanism unit according to the present exemplary embodiment.

FIG. 4 is a perspective view illustrating the recovery mechanism unit 104 according to the present exemplary embodiment. As illustrated in FIG. 4, the slider 7 is provided with an abutting portion 7*a* that comes in contact with a side surface of the carriage 6 so that the slider 7 moves within a predetermined range following the movement of the carriage 6. The slider 7 is urged in a −X direction side by a slider spring 17. This configuration allows the slider 7 to move from an evacuating position at which the blades 8 and 9 and the caps 1A and 1B are away from the recording head 5 to a wiping position at which the blades 8 and 9 can wipe the ejection port surfaces 51 and 52 of the recording head 5, respectively. In addition, the configuration allows the slider 7 to move to a capping position at which the caps 1A and 1B cover the ejection port surfaces 51 and 52 of the recording head 5, respectively. Protrusions 7*b*, which protrude from a side surface of the slider 7 in a Y direction intersecting with (orthogonal to, in this example) a moving direction of the carriage 6, are arranged at a total of four locations. FIG. 4 illustrates the protrusions 7*b* protruding in the −Y direction at two locations, and the protrusions 7*b* at the remaining two locations protrude in a +Y direction. The protrusions 7*b* at the four locations come in contact with respective slider cams 13*a* arranged on a main body bottom case 13. The slider 7 is moved by the protrusions 7*b* at the four locations sliding along cam surfaces of the respective slider cams 13*a* arranged on the main body bottom case 13. This sliding controls the slider 7 to have a predetermined height with respect to the ejection port surfaces 51 and 52 at each position (the evacuating position, the wiping position, the capping position, or the like) along the moving direction of the carriage 6.

The blade 8 for wiping the ejection port surface 51 of the recording head 5A for colors and the blade 9 for wiping the ejection port surface 52 of the recording head 5B for black are attached to the slider 7. The caps 1A and 1B for capping the ejection port surfaces 51 and 52, respectively, are attached to cap holders 2A and 2B, respectively. The cap holders 2A and 2B are each attached to the slider 7 with claws at four locations. A cap spring is arranged between the cap holder 2A and the slider 7 and between the cap holder 2B and the slider 7. The cap holders 2A and 2B, to which the caps 1A and 1B are attached, respectively, are urged toward the ejection port surfaces 51 and 52, respectively, in a +Z direction. The blades 8 and 9 and the caps 1A and 2B are arranged in order of the blade 8, the cap 1A, the blade 9, and the cap 1B, from a recording area side toward a +X direction.

As illustrated in FIG. 4, a lock lever 16, which serves as a latching member that operates so as to lock (latch) the slider 7 at the wiping position, is attached to a portion of an end of the slider 7 on the recording area side, on a downstream side in a conveying direction (−Y direction side). The lock lever 16 is attached so as to be rotationally movable to a latching position at which the lock lever 16 latches the slider 7 at the wiping position, and to a cancellation position at which the lock lever 16 cancels a latching state of the slider 7. When the carriage 6 moves to the wiping position to wipe the ejection port surfaces 51 and 52 of the recording head 5, the lock lever 16 operates so as to prevent the slider 7 from moving in the −X direction side and the −Z direction side and restrict the movement of the slider 7. The lock lever 16 is supported so as to be rotationally movable within a plane in the Y direction intersecting with (orthogonal to, in this example) the moving direction of the carriage 6. The lock lever 16 includes a supporting shaft 16*e*, and is supported to be rotationally movable about the shaft. Furthermore, by the action of urging force of a helical torsion coil spring that is not illustrated and that urges the lock lever 16 to rotate counter-clockwise, the lock lever 16 is retained at a position where the lock lever 16 has been moved by the urging force of the spring unless external torque of a predetermined value or greater acts on the lock lever 16. The position mentioned herein is a position of a state where a protrusion 16*f* of the lock lever 16 comes in contact with the slider 7 (refer to FIG. 5).

Figure 5:
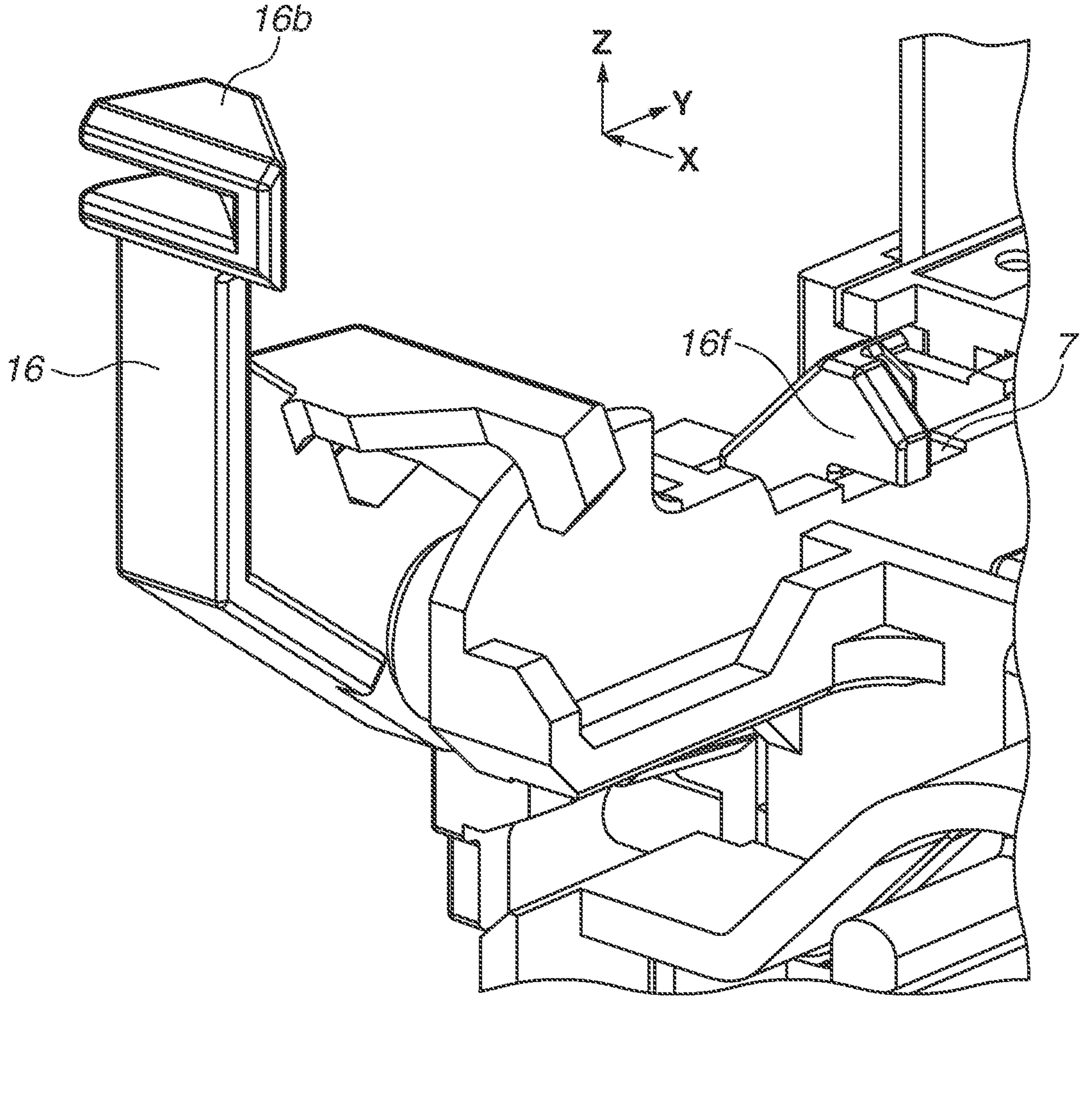
FIG. 5 is a perspective view illustrating a position of a lock lever according to the present exemplary embodiment.

FIGS. 6A, 6B, 7A, and 7B are front views illustrating the recovery mechanism unit 104 in a state where the slider 7 is at the respective positions. On the apparatus main body side, arranged is a latching portion 13*d* (FIG. 4) capable of latching a leading end surface 16*a* of the lock lever 16 when the lock lever 16 is in a state where the protrusion 16*f* thereof is in contact with the slider 7 (FIG. 5).

Figure 6A:
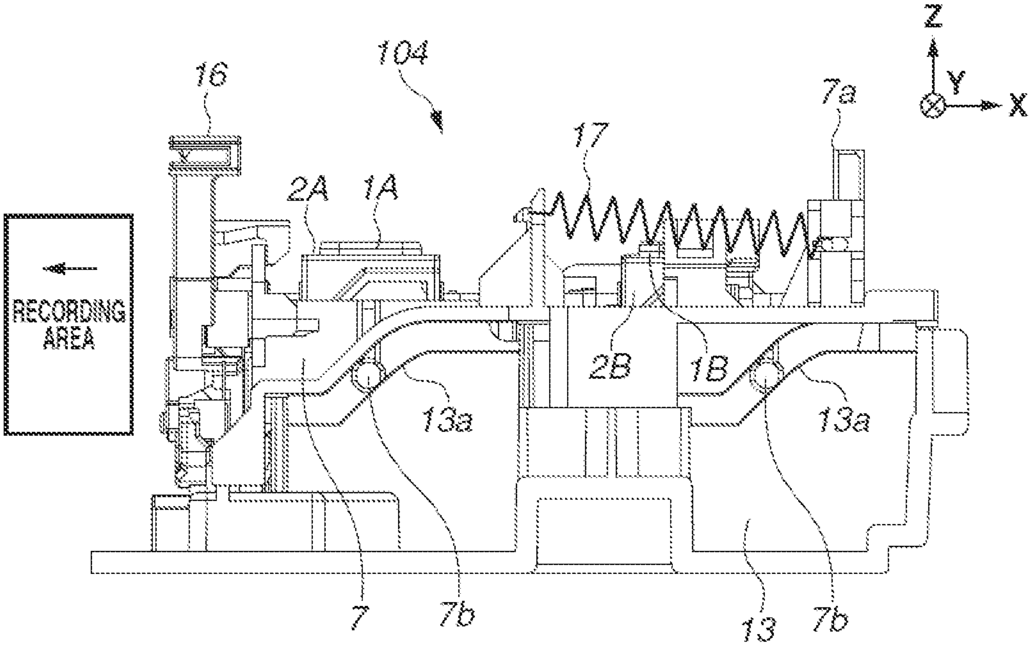
FIGS. 6A and 6B are diagrams each illustrating the recovery mechanism unit with respect to a position of a slider according to the present exemplary embodiment.
Figure 6B:
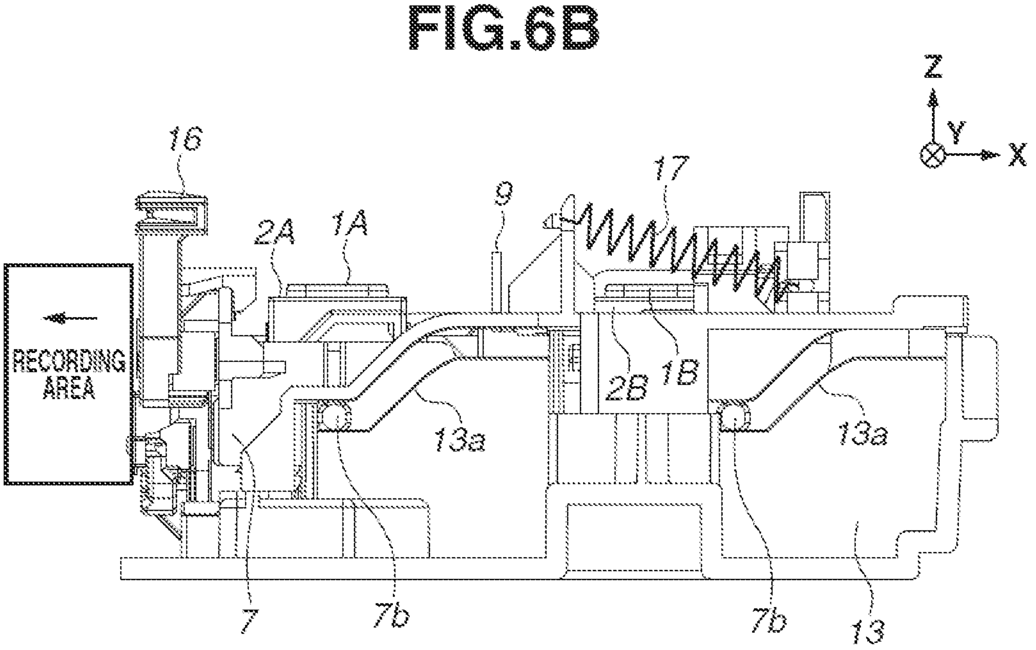

FIG. 6A illustrates a state where the recovery mechanism unit 104 when performing wiping. First, the carriage 6 moves from the recording area in the +X direction, and comes in contact with the abutting portion 7*a* to move the abutting portion 7*a* in the +X direction, thereby moving the blades 8 and 9 in the +Z direction. The leading end surface 16*a* of the lock lever 16 is latched by the latching portion 13*d* at a position illustrated in FIG. 6A, and positions of the blades 8 and 9 are fixed. In this state, the movement of the carriage 6 toward the recording area executes a wiping operation.

The carriage 6 moves toward the recording area side during the wiping operation. The carriage 6 is provided with a protrusion for unlocking 67 that can come in contact with an upper end portion 16*b* of the lock lever 16 (refer to FIG. 3). The protrusion for unlocking 67 comes in contact with the upper end portion 16*b* of the lock lever 16 when the carriage 6 moves toward the recording area, thereby rotationally moving the lock lever 16 clockwise when seen from the recording area side. With this operation, the leading end surface 16*a* of the lock lever 16 separates from the latching portion 13*d* to cancel the latching state of the lock lever 16, resulting in a state as illustrated in a state in FIG. 6B. This is a state where the blades 8 and 9 move in the −Z direction and do not come in contact with the carriage 6 nor the recording head 5, and the carriage 6 can move to the recording area and perform recording.

Figure 7A:
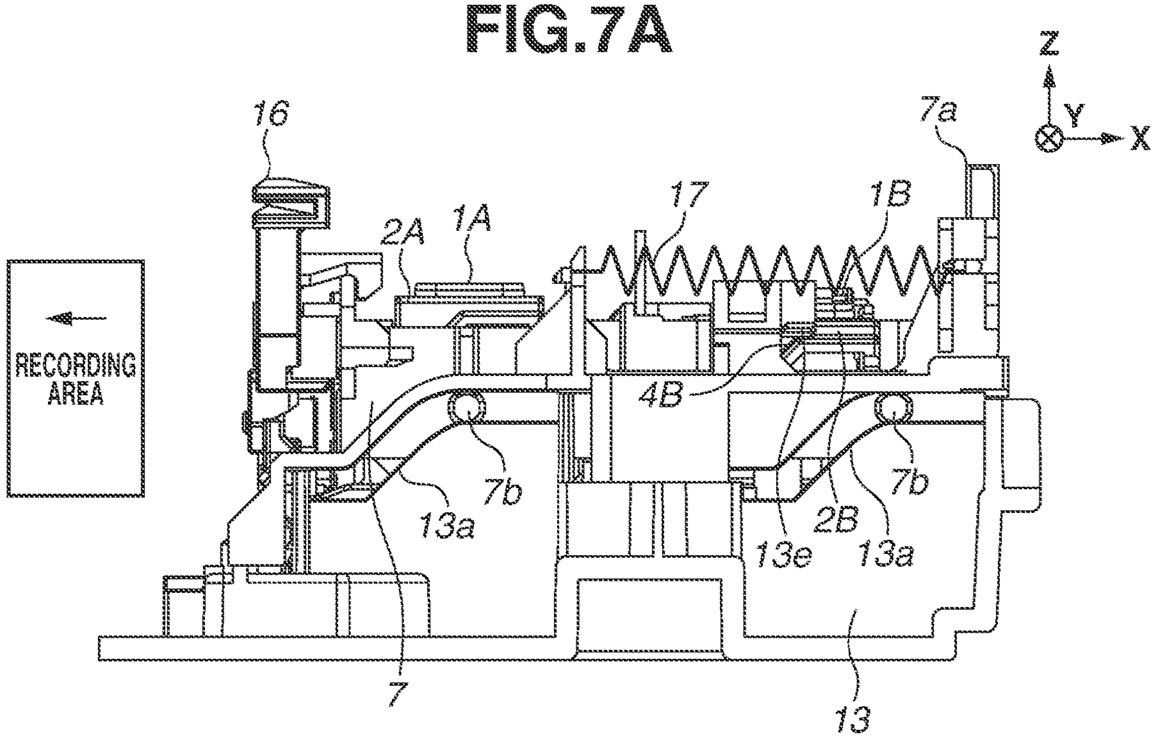
FIGS. 7A and 7B are diagrams each illustrating the recovery mechanism unit with respect to a position of the slider according to the present exemplary embodiment.

FIG. 7A illustrates an isolated suction position. A cap holder cam portion 4B is arranged on a portion of the cap holder 2B on the downstream side in the conveying direction. On the apparatus main body side, a cam portion 13*e* is arranged so as to come in contact with the cap holder cam portion 4B in a state where the slider 7 is at the isolated suction position. With this configuration, in the state where the slider 7 is at the isolated suction position, the cap holder cam portion 4B comes in contact with the cam portion 13*e* to push the cap holder 2B downward, thereby pushing the cap 1B attached to the cap holder 2B downward together.

As a result, the capping of the cap 1B is canceled, and only the cap 1A caps the ejection port surface 51. Driving the pump mechanism, which is not illustrated, at the isolated suction position, enables sucking of ink from the ejection port on the ejection port surface 51 capped by the cap 1A.

Figure 7B:
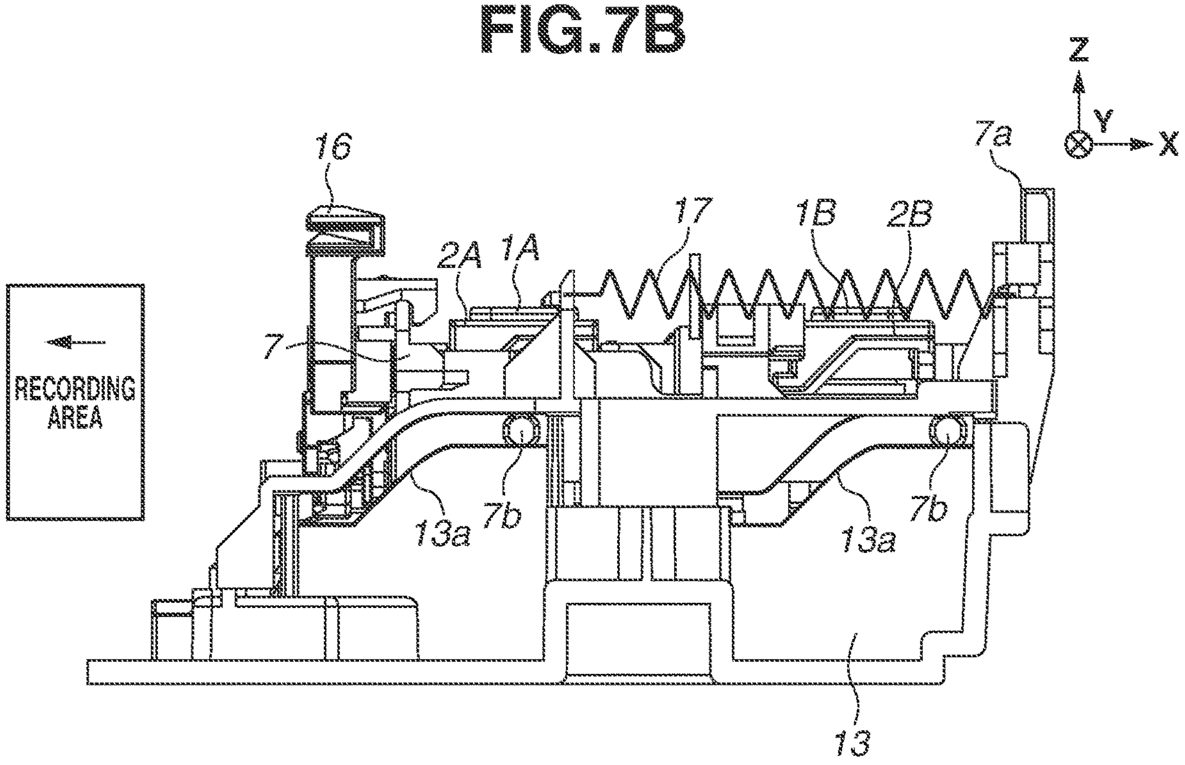

FIG. 7B illustrates a simultaneous capping position where the caps 1A and 1B can simultaneously cap the ejection port surfaces 51 and 52, respectively. Driving the pump mechanism at the simultaneous capping position enables sucking of ink from the ejection port on the ejection port surface 51 capped by the cap 1A and the ejection port on the ejection port surface 52 capped by the cap 1B.

Detailed Description of Recording Head 5

Figure 8:
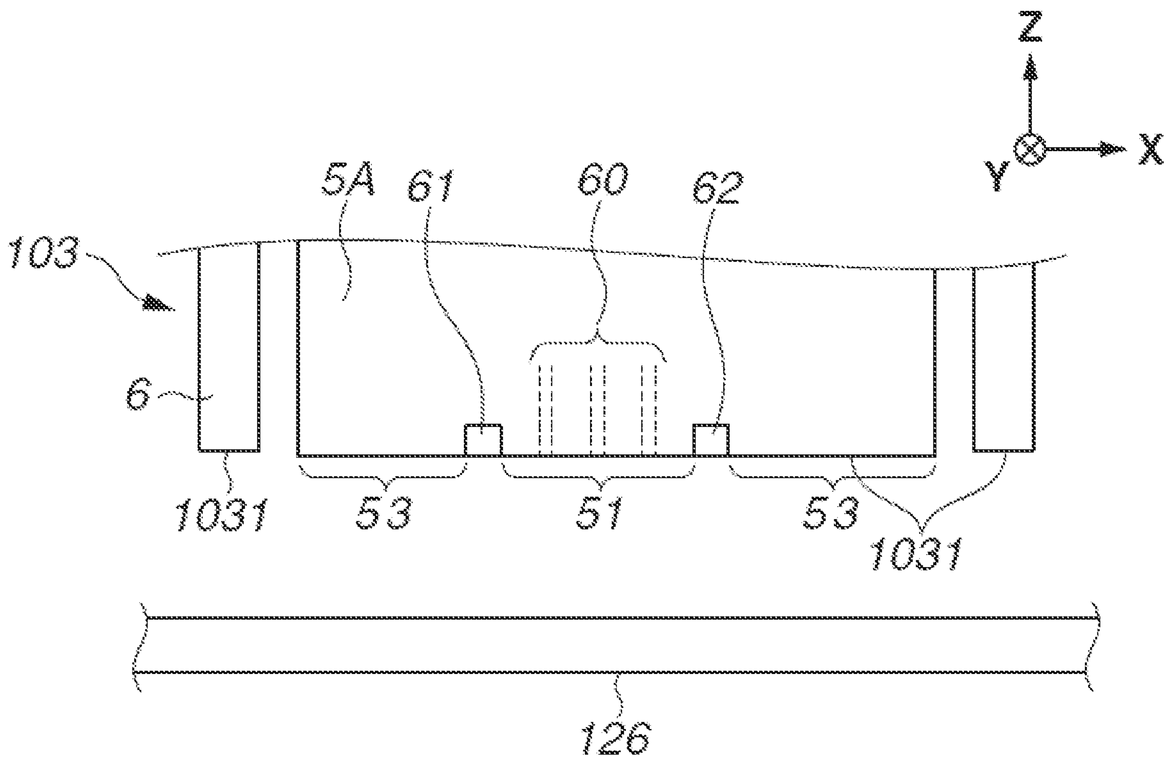
FIG. 8 is a schematic sectional view illustrating a recording head according to the present exemplary embodiment.

FIG. 8 is a schematic sectional view illustrating the recording head 5A. The recording head 5A includes a platen facing surface 1031 that faces the platen 126. In the present exemplary embodiment, the platen facing surface 1031 includes the ejection port surface 51 as part of an ejection area in which an ejection port is formed and includes a non-ejection port surface 53 as part of a non-ejection area in which no ejection port is formed, and is a wiped surface that is wiped by the blades 8 and 9 in a wiping sequence, which will be described below. A plurality of ejection ports 60 is arranged in a central portion of the ejection port surface 51 of the recording head 5A, and an ejection port array including the plurality of ejection ports 60 is formed in the Y direction. A first recessed portion 61 and a second recessed portion 62 are arranged, as step portions, so as to sandwich the ejection ports 60 on an ejection port surface side of the ejection port surface 51. The first recessed portion 61 and the second recessed portion 62 are recessed in a direction (+Z direction) opposite to a direction of ink ejection from the ejection ports 60. The first recessed portion 61 and the second recessed portion 62 are formed in a manufacturing process of the recording head 5. To attach a chip including the ejection ports 60 to the recording head 5A, the recording head 5A is provided with a recessed portion larger than the chip. Hence, gaps, which are generated when the chip is attached, serve as the first recessed portion 61 and the second recessed portion 62. Since there is a possibility that ink enters the first recessed portion 61 and the second recessed portion 62 at the time of the suction operation or the like, the first recessed portion 61 and the second recessed portion 62 are preferably small.

The recording head 5B includes a platen facing surface 1032 (FIG. 3) facing the platen 126 similarly to the recording head 5A.

The ejection port surface 52 of the recording head 5B similarly includes a first recessed portion 63 (FIG. 3) and a second recessed portion 64 (FIG. 3) on respective sides of the ejection port in the X direction.

Detailed Description about Wiping

Figure 9:
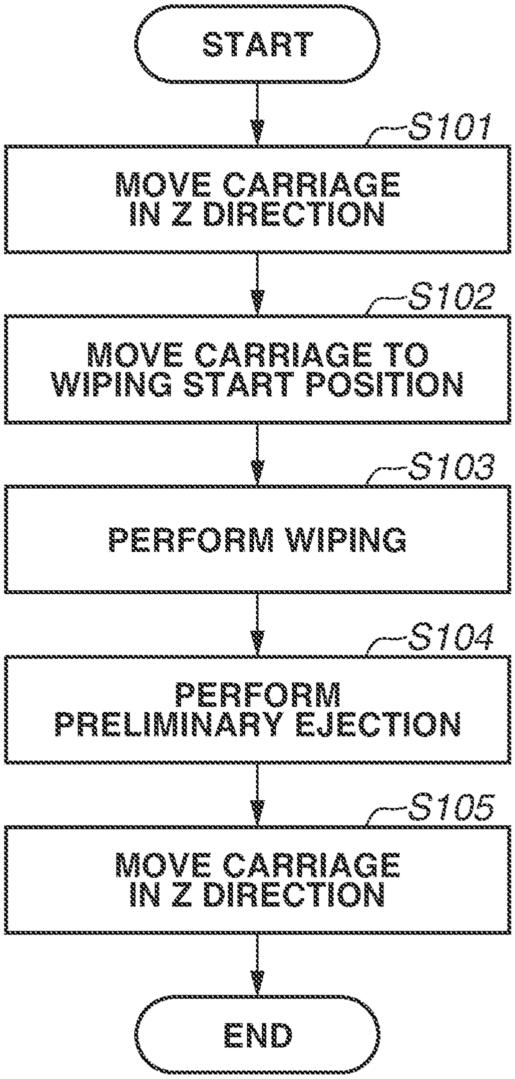
FIG. 9 is a flowchart for a wiping sequence according to the present exemplary embodiment.

FIG. 9 is a flowchart of the wiping sequence. In the present exemplary embodiment, after recording for one page ends, whether a cumulative number of dots ejected after the end of recovery processing such as suction and wiping for the previous time is a threshold or greater is determined. In a case where the cumulative number of dots is the threshold or greater, this wiping sequence is performed before recording for the next page starts. A configuration of performing the wiping sequence between pages every time may be employed. Alternatively, the wiping sequence may be executed after the recording mechanism unit 103 performs a recording operation, after the recovery mechanism unit 104 performs suction, before the recovery mechanism unit 104 performs capping, after the recovery mechanism unit 104 performs uncapping. This sequence is executed by the MPU 201 controlling each unit in accordance with a program stored in the ROM 202.

First, in step S101, the MPU 201 moves the carriage 6 in the Z direction so that the recording heads 5A and 5B and the blades 8 and 9 have such heights as to allow the platen facing surface 1031 of the recording head 5A and the platen facing surface 1032 of the recording head 5B to come in contact with the blades 8 and 9, respectively. The MPU 201 drives the paper feeding/conveying motor 205 and the carriage motor 204 to move the carriage 6 in the Z direction. The paper feeding/conveying motor 205 couples a lever, which is not illustrated, to the carriage 6. In a state where the lever is coupled to the carriage 6, the carriage motor 204 is driven to move the carriage 6 in the Z direction. In a case where the carriage 6 already has such a height as to come in contact with the blades 8 and 9 at the time of the start of the processing in FIG. 9, the processing in step S101 is not performed. The processing in step S101 allows the blade to appropriately wipe ink on the ejection port surface of the recording head.

Next, in step S102, the MPU 201 uses the carriage motor 204 to move the carriage 6 in the +X direction to a wiping start position where the blade 8 starts to come in contact with the platen facing surface 1031. The wiping start position is a position of the carriage 6 when the recovery mechanism unit 104 is brought into a state illustrated in FIG. 6A, and indicates a state where the platen facing surface 1031 is in a more advanced position in the +X direction than the blade 8 is. The wiping start position also indicates a state where the platen facing surface 1032 is in a more advanced position in the +X direction than the blade 9 is. In step S103, the MPU 201 further moves the carriage 6 in the +X direction from the wiping start position. The relative movement of the blades 8 and 9 in the X direction while coming in contact with the platen facing surfaces 1031 and 1032, respectively, wipes the ejection port surface 51 of the platen facing surface 1031 and the ejection port surface 52 of the platen facing surface 1032.

Thereafter, in step S104, the MPU 201 performs a preliminary ejection operation to eject ink, which does not contribute to recording, from the ejection ports of the recording head 5A and 5B. Finally, in step S105, the MPU 201 moves the carriage 6 in the Z direction to have a predetermined height. For example, the MPU 201 moves the carriage 6 to have a height appropriate for the next recording operation. After these steps, the wiping sequence illustrated in FIG. 9 ends.

Figure 10A:
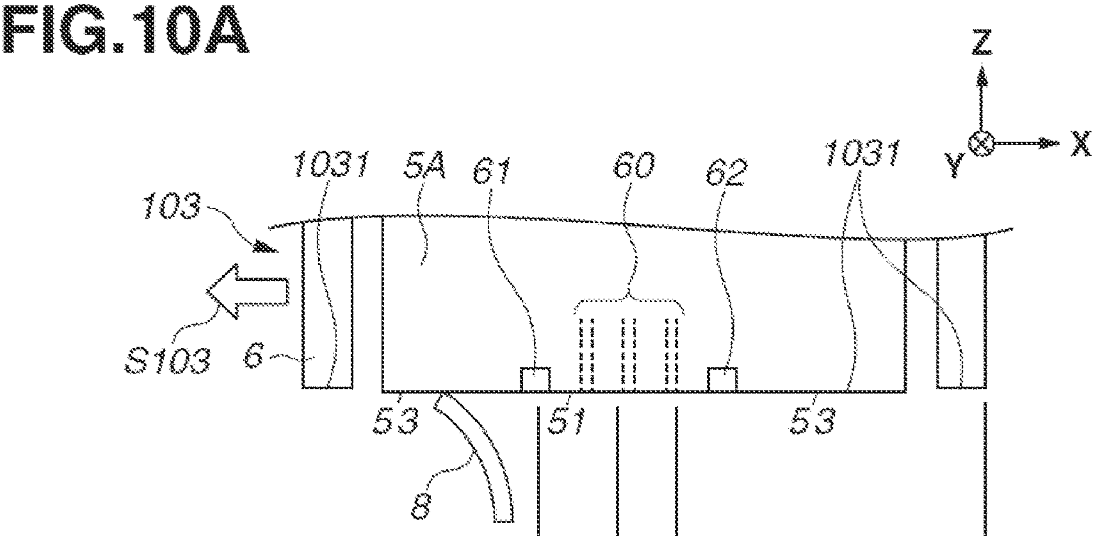
FIG. 10A is a schematic sectional view illustrating a wiping operation according to the present exemplary embodiment.
Figure 10B:
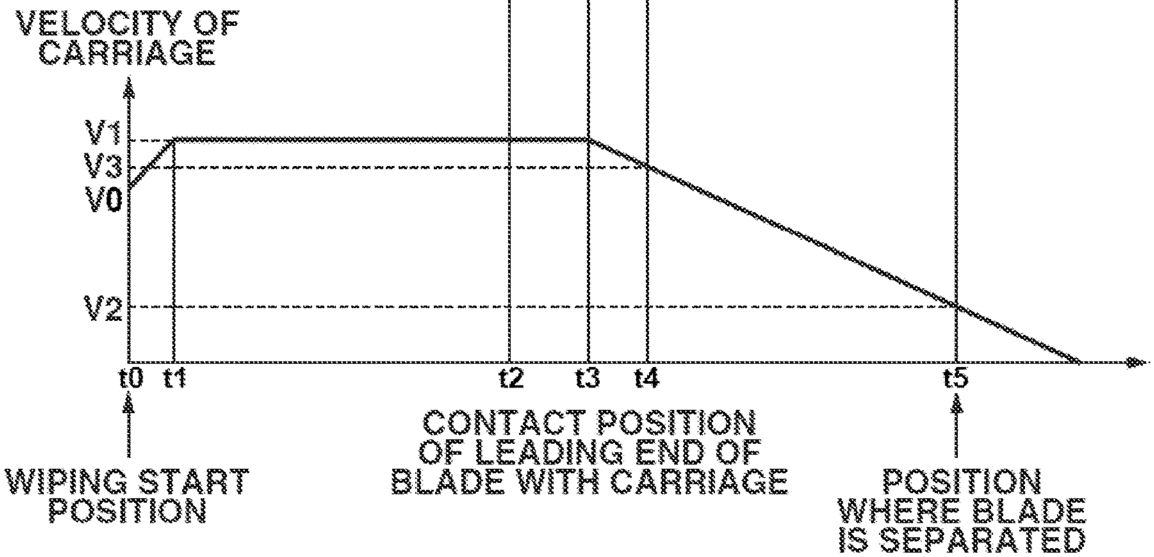
FIG. 10B is a graph illustrating a relationship between a contact position of a leading end of the blade with a carriage and a velocity of the carriage in the wiping operation according to the present exemplary embodiment.

Next, details of step S103 will be described. FIG. 10A is a schematic sectional view illustrating an operation in step S103. FIG. 10B is a graph illustrating a relationship between a contact position of a leading end of the blade 8 with the carriage 6 and a velocity of the carriage 6. While the description is given of an example of a relationship between the platen facing surface 1031 of the recording head 5A and the blade 8, the same applies to a relationship between the platen facing surface 1032 of the recording head 5B and the blade 9.

As illustrated in FIGS. 10A and 10B, the carriage 6 is accelerated from the wiping start position (t0) at velocity V0 to reach a first velocity V1(t1). For example, V1 is 18.5 inches/sec. While maintaining the first velocity V1, the MPU 201 controls the leading end of the blade 8 to come in contact with the platen facing surface 1031 of the recording mechanism unit 103 and performs wiping in a direction parallel to the platen facing surface 1031. The first recessed portion 63 is positioned on the upstream side of the ejection port 60 in a wiping direction. When the blade 8 passes the first recessed portion 61 with which the blade 8 comes in contact (t2) first before coming in contact with the ejection port 60, the velocity of the carriage 6 is the first velocity V1. While the blade 8 is in contact with the ejection port 60, the carriage 6 starts to be decelerated (t3). When the blade 8 is separated from the platen facing surface 1031 (t5), the carriage 6 is decelerated to a second velocity V2. The second velocity V2 is lower than the first velocity V1, and is, for example, 5.0 inches/sec. A third velocity V3 when the leading end of the blade 8 passes an ejection port 60 (t4), among a plurality of ejection ports 60, on the most downstream in the wiping direction in the X direction is lower than the first velocity V1, and is, for example, 15.0 inches/sec. Ink or the like that adheres to the ejection port surface 51 can be appropriately wiped even in a case where the relative velocity of the carriage 6 and the blade 8 is the first velocity V1 or the third velocity V3.

The first velocity V1 and the second velocity V2 may be velocities other than the velocities described above. The first velocity V1 is preferably a velocity between 10 inches/sec and 25 inches/sec. The second velocity V2 is preferably a velocity of 6 inches/sec or lower. The third velocity V3 is only required to be a velocity that is the first velocity V1 or lower and the second velocity V2 or higher.

Figure 11A:
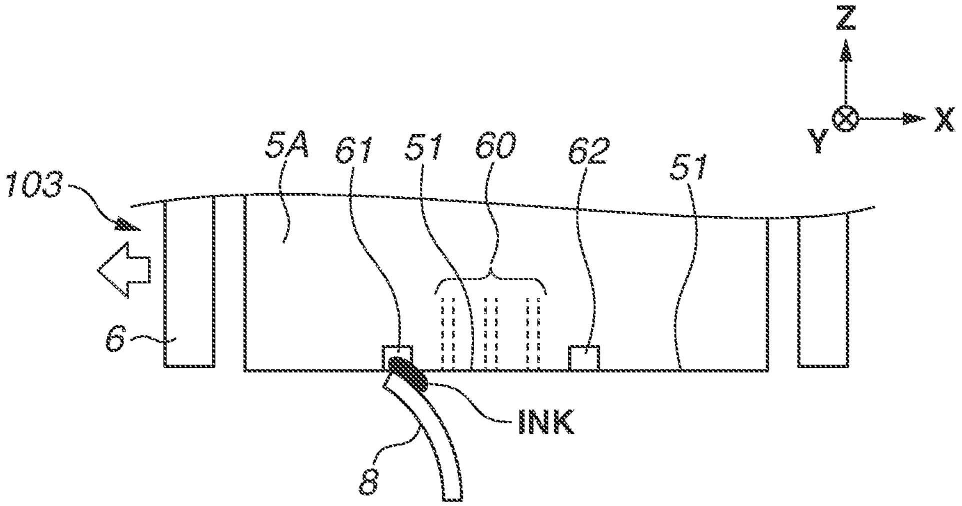
FIGS. 11A and 11B are schematic sectional views each illustrating behavior of ink in a first recessed portion in a case where a wiping velocity is low when the blade passes through the first recessed portion.
Figure 11B:
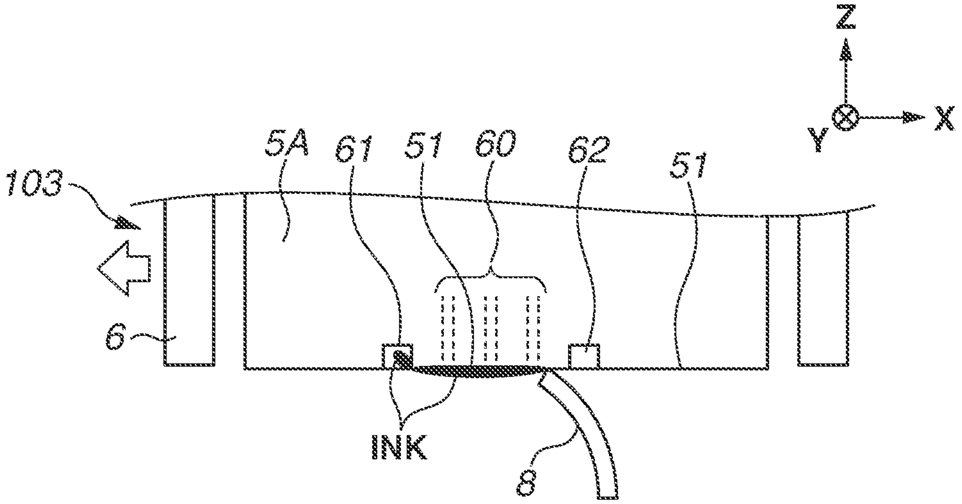

FIGS. 11A and 11B are schematic sectional views each illustrating behavior of ink that has entered the first recessed portion 61 in a case where the wiping velocity when the blade 8 passes the first recessed portion 61 is low, for example, 5.0 inches/sec. As illustrated in FIGS. 11A and 11B, in a case where the wiping velocity when the blade 8 passes the first recessed portion 61 is low, time during which the blade 8 is immediately below the first recessed portion 61 is long. Ink that has entered the first recessed portion 61 is drawn out along the blade 8. When the ink drawn out from the first recessed portion 61 by the blade 8 adheres to the surroundings of the ejection port 60, there is a possibility that an ejection failure occurs. In this manner, to prevent the ejection port from having the ejection failure by application of ink by the blade, the present exemplary embodiment increases the relative velocity of the carriage and the blade when the blade passes the first recessed portion 61 as described with reference to FIGS. 10A and 10B.

Figure 12A:
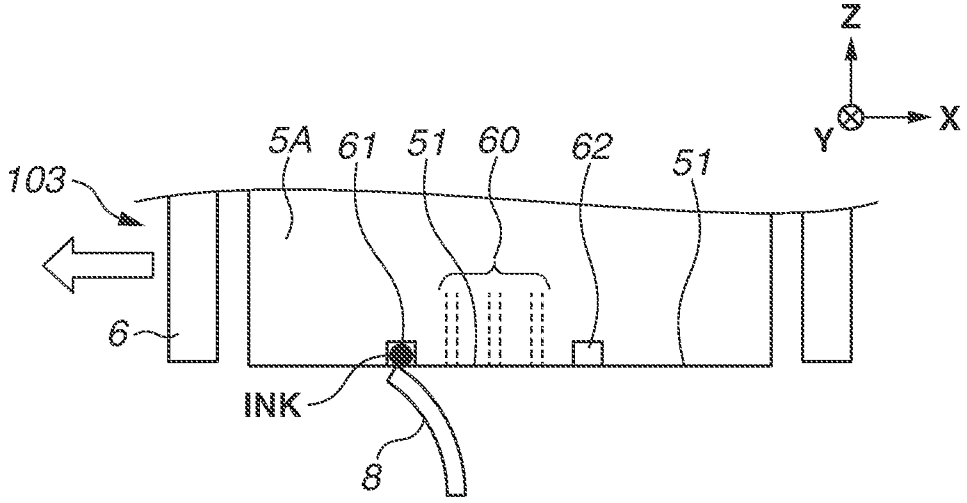
FIGS. 12A and 12B are schematic sectional views each illustrating behavior of ink at the time of the wiping operation according to the present exemplary embodiment.
Figure 12B:
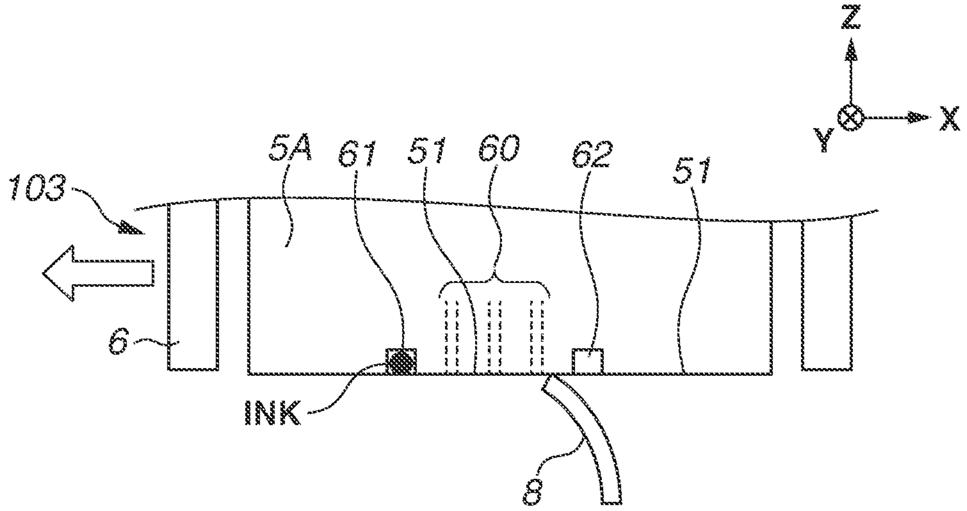

FIGS. 12A and 12B are schematic sectional views each illustrating behavior of ink in the first recessed portion 61 in a case where the wiping velocity when the blade 8 passes the first recessed portion 61 is increased, according to the present exemplary embodiment. As illustrated in FIGS. 12A and 12B, in a case where the wiping velocity when the blade 8 passes the first recessed portion 61 is high, time during which the blade 8 is immediately below the first recessed portion 61 is short, thereby preventing ink that has entered the first recessed portion 61 from being drawn out. This configuration can reduce an amount of ink applied by the blade 8 to the surroundings of the ejection port 60, and can thereby reduce ink that adheres to the surroundings of the ejection port 60 after the wiping of the ejection port 60 by the blade 8 to the case illustrated in FIGS. 11A and 11B.

In the present exemplary embodiment, the first velocity V1 is sufficiently high when the leading end of the blade 8 passes the first recessed portion 61. Meanwhile, if the blade 8 is separated from the platen facing surface 1031 while maintaining the first velocity V1, there is a possibility that ink that is accumulated at the leading end of the blade 8 is scraped out and scattered in the recording apparatus 1 due to the high velocity. To address this, the present exemplary embodiment reduces the relative velocity when the blade 8 is separated from the platen facing surface 1031 to the second velocity V2, and thereby prevents scattering of ink. Assume that the first velocity V1 is two times or higher than the second velocity V2. The lower the velocity V2 is, the more the scattering of ink can be prevented. The velocity V2 is 5.0 inches/sec in FIGS. 10A and 10B, but may be lower than 5.0 inches/sec.

In the present exemplary embodiment, the carriage 6 starts to be decelerated while the blade 8 is in contact with an area in which the ejection port 60 is formed (see t3 FIG. 10B). With this configuration, even in a case where a sufficient distance cannot be secured between a trailing end of the area in which the ejection port 60 is formed (an end portion on the +X side of the ejection port 60 in FIGS. 12A and 12B) and a position (t5) where the blade 8 is separated from the platen facing surface 1031, the carriage 6 starts to be decelerated while the blade 8 passes the ejection port 60. This can sufficiently decrease the second velocity of the carriage 6 when the blade 8 is separated from the platen facing surface 1031. Hence, the configuration can prevent ink from being drawn out from the first recessed portion 61 and prevent scattering of ink when the blade 8 is separated from the platen facing surface 1031, while implementing downsizing of the recording apparatus 1. As a matter of course, in a case where a sufficient distance can be secured between the trailing end of the area in which the ejection port 60 is formed and the position (t5) where the blade 8 is separated from the platen facing surface 1031, the carriage 6 may be decelerated after the blade 8 passes the ejection port 60.

Ink also enters the second recessed portion 62 with the suction operation or the like. Hence, in a case where the relative velocity of the carriage 6 and the blade 8 is low when the blade 8 passes the second recessed portion 62, there is a possibility that the blade 8 draws out ink. Since ink, even when drawn out, is not applied to the area in which the ejection port 60 is formed on the ejection port surface 51, there is no possibility that the ejection failure occurs. Thus, there is no issue if the velocity when the blade 8 passes the second recessed portion 62 is lower than the first velocity V1.

Operational control of wiping at this time is applicable not only to the recording head 5A for colors, but also to the recording head 5B for black, and exhibits similar effects.

While the first recessed portion 61 into which ink enters is formed in the recording head 5A out of the platen facing surface 1031 in the present exemplary embodiment, the same control performed in a case where a recessed portion into which ink enters is formed in the carriage 6 can also exhibit similar effects.

Figure 13A:
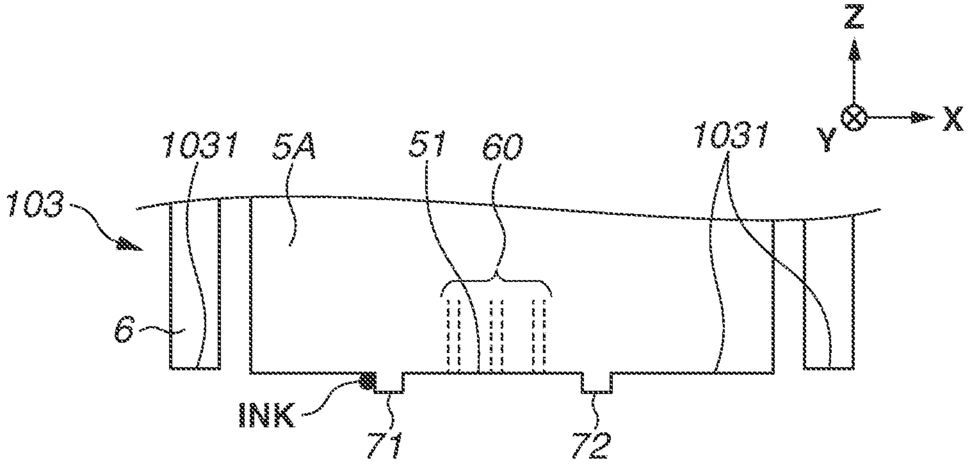
FIGS. 13A and 13B are schematic sectional views each illustrating the recording head according to the present exemplary embodiment.
Figure 13B:
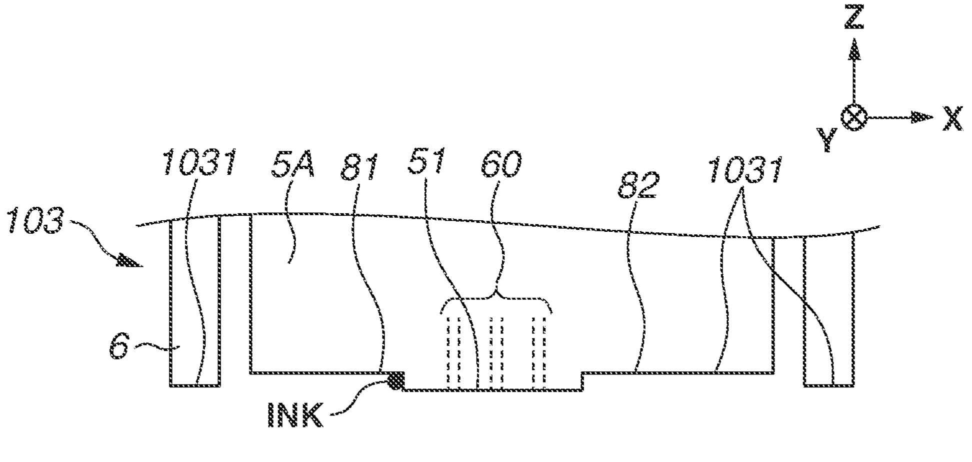

FIGS. 13A and 13B are schematic sectional views each illustrating an example of a shape of a step portion formed on the platen facing surface 1031 and in which ink is accumulated. While the description has been given of the first recessed portion 61 and the second recessed portion 62 as examples of the shapes that allow the entry of ink in the present exemplary embodiment, performing wiping using the method described with reference to FIG. 9 and FIGS. 11A and 11B in a case where the step portion has a shape as illustrated in FIGS. 13A and 13B can reduce an amount of ink applied to the surroundings of the ejection port.

FIG. 13A illustrates a configuration in which a first projecting portion 71 is formed on one side of the ejection port surface 51 and a second projecting portion 72 is formed on the other side of the ejection port surface 51. In this case, there is a possibility that ink that has entered a root of the first projecting portion 71 is drawn out and applied to the surroundings of the ejection port 60, and thereby cause the ejection failure. FIG. 13B illustrates a configuration in which a first recessed portion 81 is formed on one side of the ejection port surface 51 and a second recessed portion 82 is formed on the other side of the ejection port surface 51. In this case, there is a possibility that ink that has entered a step portion between the first recessed portion 81 and the ejection port surface 51 is drawn out, and thereby cause the ejection failure. In a case where the configurations in which the blade passes the ejection port 60 after passing a portion into which ink enters as illustrated in FIGS. 13A and 13B are adopted, performing wiping using the method described with reference to FIG. 9, and FIGS. 11A and 11B can reduce an amount of ink applied to the surroundings of the ejection port. Accordingly, the configuration can prevent occurrence of the ejection failure.

While the description has been given of the configuration in which one recessed portion or one projecting portion is formed on the upstream side in the wiping direction in the area in which the ejection port is arranged, the present exemplary embodiment can be applied to a configuration in which two or more recessed portions or two or more projecting portions are formed or both the recessed portions and the projecting portions are formed.

While the blades 8 and 9 are stationary and the carriage 6 moves to perform wiping in the exemplary embodiment described above, a configuration in which the blades 8 and 9 move and the carriage 6 is stationary may be employed. Alternatively, a configuration in which both the blades 8 and 9 and the carriage 6 move may be employed.

While the exemplary embodiment described above has a configuration in which the step portion, into which ink enters, is formed on both sides of the ejection port 60 in the main-scanning direction (X direction) and the blade and the carriage relatively move in the X direction to perform wiping, the configuration is not limited thereto. For example, a configuration in which the step portion is formed on both sides of the ejection port 60 in the sub-scanning direction (Y direction) and the blade and the carriage relatively move in the Y direction to perform wiping may be employed.

OTHER EMBODIMENTS

Embodiment(s) of the present disclosure can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)), a flash memory device, a memory card, and the like.

As described above, the present exemplary embodiment can prevent ink accumulated in the step portion on the ejection port surface of the recording head from adhering to the surroundings of the ejection port at the time of wiping.

While the present disclosure has been described with reference to exemplary embodiments, it is to be understood that the disclosure is not limited to the disclosed exemplary embodiments. The scope of the following claims is to be accorded the broadest interpretation so as to encompass all such modifications and equivalent structures and functions.

This application claims the benefit of Japanese Patent Application No. 2020-196419, filed Nov. 26, 2020, which is hereby incorporated by reference herein in its entirety.

What is claimed is:

1. A recording apparatus comprising:

a recording head including an ejection port surface and a step portion, wherein a plurality of ejection port arrays, each having a plurality of ejection ports configured to eject ink, is arranged on the ejection port surface, and wherein the step portion is formed at a position different from an area in which the plurality of ejection port arrays is arranged on the ejection port surface;

a blade configured to wipe the plurality of ejection port arrays of the ejection port surface; and a moving unit configured to perform relative movement of the blade and the recording head by moving at least one of the blade or the recording head so as to move the blade, with respect to the recording head, in a first direction, wherein, when performed, the relative movement of the blade and the recording head performed by the moving unit causes the blade to wipe a wiped surface including the ejection port surface in the first direction from the step portion to the area in which the plurality of ejection port arrays is arranged, wherein the moving unit is configured to perform the relative movement of the blade and the recording head to reach relative velocities between the relative movement of the blade and the recording head so that:

(i) the recording head is accelerated from an initial velocity (V0) at a wiping start position to reach a first relative velocity (V1) when a leading end of the blade first contacts the wiped surface and subsequently caused to maintain the first relative velocity (V1) as the leading end of the blade contacts and passes over the step portion at the first relative velocity (V1), and (ii) the recording head then is decelerated from the first relative velocity (V1) beginning when the leading end of the blade passes an ejection port array among the plurality of ejection port arrays to reach a third relative velocity (V3) at the most downstream ejection port array among the plurality of ejection port arrays in a wiping direction, and then to reach a second relative velocity (V2) when contact between the leading end of the blade and the wiped surface is discontinued, and wherein the first relative velocity (V1) is such that a time during which the blade is immediately below the step portion is sufficiently short to prevent the blade from drawing out ink that has entered the step portion, the third relative velocity (V3) is less than the first relative velocity (V1), the first relative velocity (V1) and the third relative velocity (V3) each are at least three times the second relative velocity (V2) and are sufficient for the blade to appropriately wipe ink that adheres to the ejection port surface from the ejection port surface, and the second relative velocity (V2) is more than zero.

2. The recording apparatus according to claim 1, wherein the plurality of ejection port arrays is arranged on the ejection port surface of the recording head in the first direction.

3. The recording apparatus according to claim 1, wherein the step portion includes a portion that is recessed from a surface on which the plurality of ejection port arrays is arranged on the ejection port surface in a direction opposite to a direction in which ink is ejected from the plurality of ejection port arrays.

4. The recording apparatus according to claim 1, wherein the wiped surface includes the step portion on a further downstream side than the area in which the plurality of ejection port arrays is arranged in the wiping direction from the step portion toward the area in which the plurality of ejection port arrays is arranged.

5. The recording apparatus according to claim 1, wherein the moving unit further is configured to perform the relative movement of the blade and the recording head in the first direction by moving the recording head in the first direction.

6. The recording apparatus according to claim 1, wherein each of the plurality of ejection port arrays is configured to arrange plural ejection ports of the plurality of ejection port arrays in a second direction that intersects the first direction, and wherein the plurality of ejection port arrays is arranged in the first direction on the ejection port surface.

7. The recording apparatus according to claim 1, wherein the step portion is formed by a recessed portion that is recessed from the ejection port surface and a projecting portion that projects outward and away from the ejection port surface, and wherein the first relative velocity (V1) is 10 inches/sec to 25 inches/sec.

8. The recording apparatus according to claim 1, wherein the second relative velocity (V2) is low enough to prevent scattering of ink from the blade when the blade that has been in contact with the wiped surface is separated from the wiped surface.

9. The recording apparatus according to claim 1, further comprising a carriage on which the recording head can be mounted, wherein, while the blade is in contact with the plurality of ejection port arrays and before completing wiping of the plurality of ejection port arrays, the moving unit causes the carriage to start decelerating from first relative velocity (V1) to a velocity that is low enough to prevent scattering of ink from the blade when contact between the blade and the wiped surface is discontinued.

10. The recording apparatus according to claim 1, wherein, in a first case where the blade passes over the step portion and the first relative velocity (V1) is a first velocity, the blade draws out a first amount of ink that has entered the step portion, and in a second case where the blade passes over the step portion and the first relative velocity (V1) is a second velocity that is more than the first velocity, the blade draws out a second amount of ink that has entered the step portion in the second case that is less than the first amount of ink, and wherein the first relative velocity (V1) is set to the second velocity when the moving unit causes the blade to wipe the wiped surface from the step portion to the area in which the plurality of ejection port arrays is arranged.

11. The recording apparatus according to claim 7, wherein the ejection port surface and the plurality of ejection port arrays are located in a main recessed portion of the recording head and the ejection port surface is attached to the recording head in the main recessed portion, and wherein the step portion is a recessed portion of the main recessed portion that does not include the ejection port surface.

12. The recording apparatus according to claim 7, wherein the recording head includes a platen facing surface having the ejection port surface and a non-ejection port surface and is configured to face a platen that can receive a recording medium for recording, and wherein the step portion is defined by a distance in the first direction between the non-ejection port surface and the ejection port surface that is recessed in a direction opposite to a direction of ink ejection from the plurality of ejection port arrays.

13. The recording apparatus according to claim 1, further comprising:

a recording cartridge having an ink tank; and a carriage capable of reciprocally moving in a main-scanning direction, wherein the recording cartridge is mounted on the carriage and the recording head and the ink tank are integrated with each other as an ink cartridge.

* * * * *